United States Patent [19]

Dehn

[11] Patent Number: 4,500,233

[45] Date of Patent: * Feb. 19, 1985

[54] ROTARY MATERIAL REMOVING TOOL

[75] Inventor: Dieter Dehn, Frankfurt am Main, Fed. Rep. of Germany

[73] Assignee: Stellram GmbH, Heusenstramm, Fed. Rep. of Germany

[*] Notice: The portion of the term of this patent subsequent to Aug. 7, 2001 has been disclaimed.

[21] Appl. No.: 398,796

[22] Filed: Jul. 16, 1982

[30] Foreign Application Priority Data

Feb. 12, 1982 [DE] Fed. Rep. of Germany ....... 3204923

[51] Int. Cl.³ .............................................. B23B 29/03
[52] U.S. Cl. ..................................... 408/182; 408/185
[58] Field of Search ............... 408/181, 182, 183, 185, 408/153; 82/2 E, 1.2

[56] References Cited

U.S. PATENT DOCUMENTS

| 2,151,251 | 3/1939 | Weidner | 408/181 |
| 3,069,932 | 12/1962 | Sweeny et al. | 408/185 |
| 4,006,995 | 2/1977 | Gruner | 408/181 X |
| 4,405,268 | 9/1983 | Abe | 408/182 |

FOREIGN PATENT DOCUMENTS 572782 2/1976 Switzerland .................. 408/181

Primary Examiner—William R. Briggs
Attorney, Agent, or Firm—Peter K. Kontler

[57] ABSTRACT

A rotary material removing tool has an elongated support whose rear end portion can receive torque from the motor of a boring or milling machine and whose front end portion has a front end face with a transverse recess for a carrier having in its front end face a transversely extending dovetailed guide groove for two elongated knife holders which are shiftable relative to each other and with reference to the carrier to select the distance between their knives. The support has two legs which flank the recess and bear against the carrier to hold the latter in abutment with the bottom surface in the recess and to deform elongated portions of the carrier into frictional engagement with adjacent portions of the two holders when the free ends of the legs are urged toward each other by a clamping screw. The holders can be shifted lengthwise of the guide groove in the carrier by discrete screws whose shanks mesh with the carrier and whose heads extend without axial play into notches of the respective holders and with axial play into notches of the carrier.

25 Claims, 7 Drawing Figures

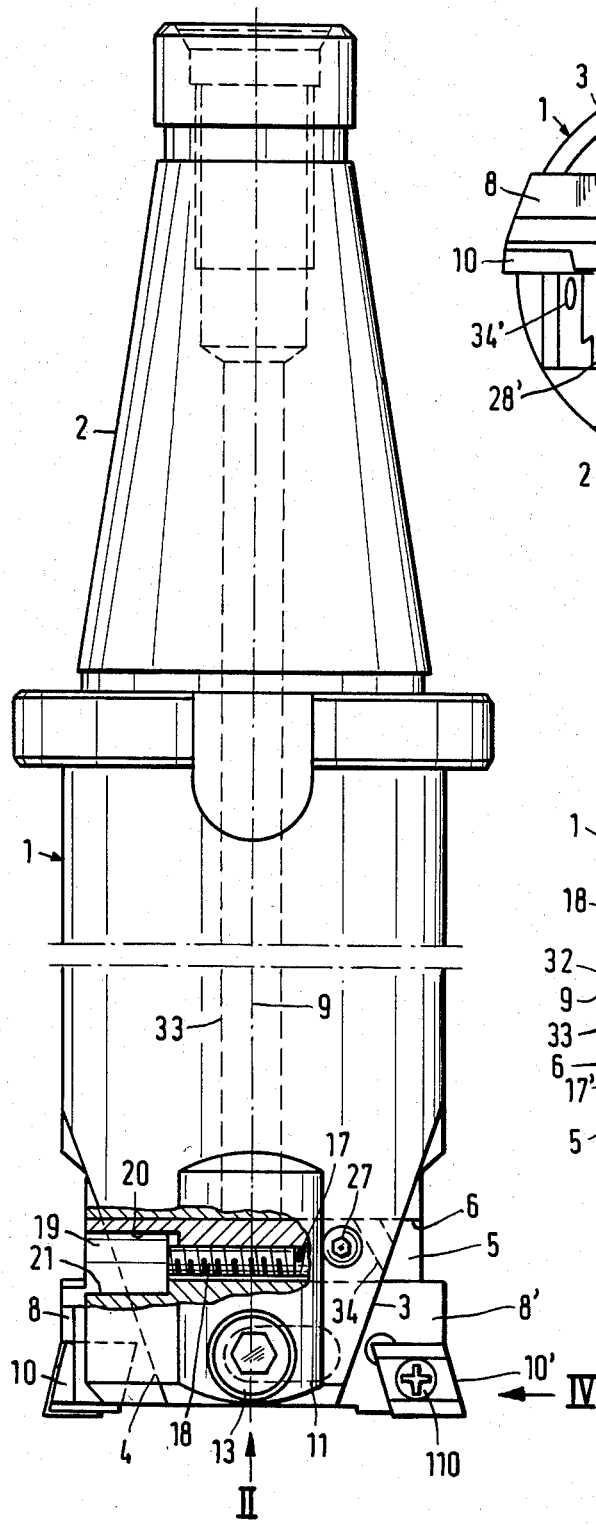
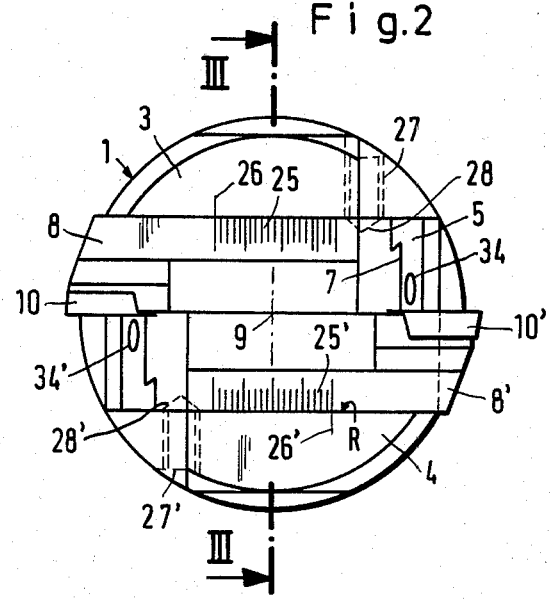
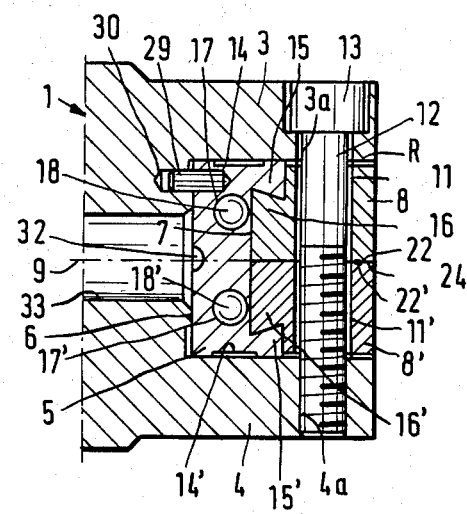

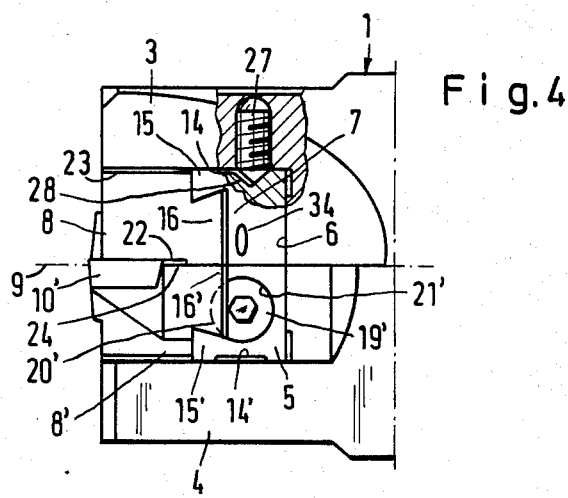
Fig. 4
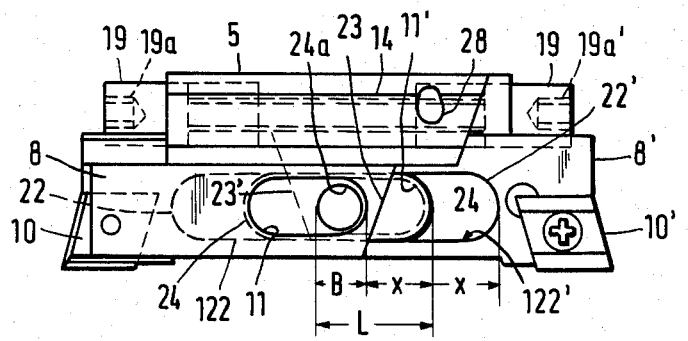
Fig. 5
Fig. 6
Fig. 7

ROTARY MATERIAL REMOVING TOOL

CROSS-REFERENCE TO RELATED CASE

The tool of the present invention is identical with that which is described and shown in my commonly owned copending patent application Ser. No. 398,633 filed July 15, 1982 for DEVICE FOR MAKING HOLES U.S. Pat. No. 4,464,088.

BACKGROUND OF THE INVENTION

The present invention relates to rotary tools, especially to rotary material removing boring, milling or analogous tools. More particularly, the invention relates to improvements in drilling, boring, milling, reaming or like tools of the type wherein one or more knives are removably and adjustably mounted at the front end of an elongated support, such as a drill rod whose rear end portion can receive torque from the prime mover of a drilling, boring, milling or like machine.

It is already known to mount a clamping member for two relatively movable knife holders at the front end of an elongated rotary rod-like support. The holders are disposed in a common plane which extends at right angles to the axis of rotation of the support and are movable relative to each other substantially radially or diametrically of the support so that the knives which are mounted at their outer ends can make or finish a hole of desired diameter. As a rule, the holders are reciprocable with reference to the clamping member which is secured to the support by several clamping screws. The knives may constitute plate-like blades whose cutting edges remove material from a workpiece, or from the surface surrounding an existing bore or hole, when the support receives torque from the prime mover of the machine. The clamping member supports bolts which enable an operator to shift the two holders transversely of the axis of the support, i.e., to change the distance between the cutting edges of the two knives. When the tool is in actual use, the holders are held against movement relative to each other and relative to the clamping member by the aforementioned clamping screws which further serve to hold the clamping member against movement relative to the support.

In accordance with a presently known proposal, the front end face of the front end of the support is toothed or ribbed and is engaged by similarly toothed or ribbed rear surfaces of the two holders. The clamping member is a plate which is traversed by clamping screws extending in parallelism with the axis of rotation and meshing with the front end of the support. The holders have elongated slots which are traversed by the shanks of the clamping screws so that each holder can be shifted in the longitudinal direction of the slots in order to move the corresponding knife nearer to or further away from the other knife. The heads of the clamping screws bear against the exposed side of the plate-like clamping member which overlies the holders and urges their toothed surfaces into engagement with the toothed end face of the front end of the support. The clamping member is further formed with tapped bores for headless grub screws which extend at right angles to the axis of rotation of the support and have conical tips bearing against axially parallel surfaces of the holders. By rotating the grub screws, an operator can move the holders lengthwise of the aforementioned ribs provided that the clamping screws are sufficiently loose to reduce the bias of the clamping member upon the holders.

A drawback of the just discussed tool is that the grub screws cannot retract the respective holders, i.e., all such screws can do is to move the respective holders in a single direction. This is due to the fact that the grub screws do not mesh with but merely abut against the respective knife holders. Furthermore, the holders cannot be adjusted with reference to one another if they are detached from the support, i.e., from the clamping member which carries the grub screws. Still further, each and every adjustment of the knife holders relative to each other must be preceded by loosening of several clamping screws which normally bias the clamping member against the holders to thereby urge the toothed surfaces of the holders against the toothed end face of the front end of the support. A further drawback of the just discussed tool is that, though the holders can be shifted through considerable distances (because they partially overlap each other in their common plane), the clamping member can overlie only relatively small portions of the holders when the distance between the knives at the outer ends of the holders is increased so that the clamping force which prevents movements of the holders when the tool is in actual use must be increased proportionally with increasing diameter of the hole which is to be drilled or finished. Moreover, when the holders extend laterally beyond the clamping member, they are subjected to rather pronounced bending stresses which reduce the likelihood of the making a hole with a predictable diameter. Last but not least, the aforementioned elongated slots of the holders are exposed so that they rapidly accumulate shavings, chips and other foreign matter which interferes with adjustment of the holders relative to each other when the operator decides to move the knives nearer to or away from each other. Such entrapped foreign matter also interferes with evacuation of shavings and/or chips from the locus of removal of material by the knives, and the entrapped foreign matter is likely to effect unintentional shifting of the holders relative to each other so that the distance between the two knives changes without any initiative on the part of the operator.

OBJECTS AND SUMMARY OF THE INVENTION

An object of the invention is to provide a novel and improved material removing tool wherein the support for the knife or knives is designed in such a way that it allows for adequate retention and clamping of the knife holders irrespective of whether the tool is intended to make or finish a hole having a large, medium or small diameter.

Another object of the invention is to provide tool wherein the adjustment of the knife or knives relative to their support is simpler and less time-consuming than in heretofore known tools.

A further object of the invention is to provide a tool wherein the positions of the knife holders can be changed within a wide range without adversely affecting the stability of such holders and without necessitating proportional changes in the magnitude of clamping force which is applied to hold the holders in requisite positions during treatment of workpieces or the like.

An additional object of the invention is to provide novel and improved clamping means and novel and improved holder means for use in a tool of the above outlined character.

A further object of the invention is to provide a tool which is constructed and assembled in such a way that accidental shifting of the knife or knives relative to their support is highly unlikely or plain impossible.

Another object of the invention is to provide a tool wherein chips, shavings and/or other foreign matter cannot interfere with removal of material by one or more knives and cannot initiate any undesirable and/or untimely shifting of the knife holders.

An additional object of the invention is to provide a tool which can be used in known milling, boring, drilling or analogous machines as a superior substitute for heretofore known tools.

Another object of the invention is to provide novel and improved means for carrying and clamping the holders for blades or other types of knives against movement relative to the support when the tool is in actual use.

An additional object of the invention is to provide novel and improved means for preventing penetration of solid matter between the holders and their carrier and/or guide means as well as between such carrier or guide means and the support.

A further object of the invention is to provide a tool of the above outlined character wherein the adjustment of the knives relative to each other can be completed by resorting to simple and readily available implements, such as screw drivers, wrenches or the like.

Another object of the invention is to provide a tool wherein the distance between two knives can be reduced or increased with the same facility and wherein the knives can be adjusted relative to one another even if they are detached from the torque transmitting support therefor.

An additional object of the invention is to provide the tool with novel and improved means for facilitating accurate adjustment of the knife holders relative to each other.

The invention is embodied in a material removing tool which comprises a rotary support (e.g., an elongated rod) having a first portion (e.g., a conical end portion of the rod) which can receive torque from the prime mover of a boring, milling or another machine, a second portion having an end face with a recess which extends transversely of the axis of the support and a bottom surface in the recess, and a pair of legs which flank the recess and extend forwardly of the bottom surface. The tool further comprises a carrier which is disposed in the recess so as to abut the bottom surface and has a front end face provided with an elongated guide groove extending transversely of the axis of the support, a pair of abutting knife holders installed in and shiftable lengthwise of the guide groove, and clamping means for biasing the legs of the support against the carrier. The bottom surface is preferably elongated, as considered transversely of the axis of the support, and the length of the carrier preferably at least approximates the length of the bottom surface. In accordance with a presently preferred embodiment of the invention, the guide groove is a dovetailed groove with two undercut regions for portions of the holders so that the carrier prevents movements of the holders in the axial direction of the support. The clamping means can comprise an elongated threaded member which extends through the legs and at least substantially transversely of the axis of the support. For example, the head of the threaded member can engage a shoulder in one of the legs, and the shank of the threaded member can mesh with threads in a tapped bore of the other leg. The means for shifting the holders lengthwise of the guide groove can comprise screws which mesh with the carrier and have heads capable of moving the respective holders relative to the carrier in response to rotation of such screws.

The holders are provided with elongated slots extending in the longitudinal direction of the guide groove and receiving the elongated clamping member with a certain amount of clearance to thus enable the holders to move lengthwise of the guide groove and transversely of the elongated clamping member.

The width of the carrier can slightly exceed the combined width of the two holders, as considered at right angles to the longitudinal direction of the guide groove and transversely of the axis of the support. Furthermore, those portions of the carrier which flank the holders are preferably stressed so as to bear against the respective holders and bias the holders against each other.

The aforementioned undercut regions of the guide groove extend lengthwise of the groove, and those portions of the holders which extend into such undercut regions serve the aforementioned purpose of preventing extraction of holders from the carrier, as considered in the axial direction of the support. Those (lateral) surfaces of the carrier which are adjacent to the inner sides of the legs are preferably formed with shallow flutes which extend lengthwise of the guide groove and promote the deformability of the carrier into requisite frictional engagement with the holders under the action of the clamping means.

The knives (e.g., small plate-like blades) are provided at the outer ends of the holders and extend outwardly beyond the outline of the second portion of the support. Those surfaces of the two holders which abut against each other are formed with shallow recesses surrounding the respective ends of the aforementioned slots and extending outwardly toward the respective knives and inwardly all the way to the inner ends of the respective holders. The elongated threaded member of the clamping means extends through the two slots and through the centrally located hole of a preferably plate-like intercepting member which is received in the recesses of the holders and serves to prevent penetration of foreign matter (such as chips, shavings or the like) into those portions of the respective ends of the slots which are not concealed by the holders and/or occupied by the threaded member of the clamping means irrespective of the selected distance between the knives, i.e., irrespective of the positions of the two holders relative to one another. Thus, the plate-like intercepting member extends laterally beyond the opposite sides of the threaded clamping member, preferably through distances which at least equal the length of a slot minus the diameter of the threaded member. The recesses of the holders extend beyond the respective slots and toward the corresponding knives through the aforementioned distances which preferably at least equal the length of a slot minus the diameter of the threaded clamping member. The holders have edge faces which flank the recesses therein and guide the intercepting member during adjustment of the holders with reference to each other and with reference to the carrier.

The aforementioned undercut portions of the guide groove in the carrier are preferably flanked by elongated smooth surfaces which are flat and extend lengthwise of the guide groove at oblique angles to the axis of the support. Such flat surfaces preferably make acute angles with the bottom surface of the support.

The carrier and the holders define chambers for the preferably cylindrical heads of the aforementioned shifting screws. Each such chamber is preferably defined by a notch of the carrier and a notch of the respective holder. The notches of the holders receive the heads of the respective shifting screws without axial play but such heads are movable axially in the notches of the carrier so as to enable the shifting screws to move the holders relative to the carrier when such screws are rotated by screw drivers or by analogous implements which are insertable through the open outer ends of notches in the carrier. The length of the heads of shifting screws preferably matches or exceeds the extent of axial shiftability of such screws relative to the carrier; this prevents penetration of chips, shavings and/or other foreign matter into the chambers and interference with adjustment of the holders relative to the carrier.

Additional screws (preferably headless grub screws) are preferably inserted into tapped holes of the two legs and have preferably conical tips extending into conical or similarly configured sockets in those surfaces of the carrier which are adjacent to the legs. The grub screws are designed to cooperate with the carrier so as to urge the latter toward the bottom surface of the support. This can be achieved by placing the axes of the sockets at a greater distance from the bottom surface than the axes of tapped bores in the legs, i.e., when the grub screws are driven home, their tips bear eccentrically against the surfaces surrounding the respective sockets whereby the carrier is automatically urged deeper into the recess in the second portion of the support. The tapped bores in the legs of the support are disposed at opposite sides of the axis of the support and preferably extend at right angles to and radially of such axis.

The tool is preferably further provided with means for facilitating the adjustment of knife holders relative to the carrier, as considered in the longitudinal direction of the guide groove. Such facilitating means can comprise a scale at the front end face of each holder and an index or marker at the front end face of the respective leg, or vice versa.

The novel features which are considered as characteristic of the invention are set forth in particular in the appended claims. The improved tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an elevational view of a tool which embodies the invention, a portion of the tool being shown in section and the holders for the knives being shown in fully retracted positions;

FIG. 2 is a front elevational view of the tool as seen in the direction of arrow II in FIG. 1;

FIG. 3 is an axial sectional view as seen in the direction of arrows from the line III—III in FIG. 2;

FIG. 4 is an elevational view of the tool as seen in the direction of arrow IV in FIG. 1;

FIG. 5 is an elevational view of a carrier for the knife holders, with the holders shown in fully extended positions;

FIG. 6 is a front elevational view of an intercepting member which is used in the structure of FIG. 5; and FIG. 7 is a rear elevational view of the structure shown in FIG. 5.

DESCRIPTION OF THE PREFERRED EMBODIMENTS

Referring first to FIG. 1, there is shown a material removing tool which can be utilized to make or finish holes or bores in metallic or other types of workpieces. The tool comprises an elongated rod-like support 1 having a conical rear end portion 2 which can be inserted into the output element of a suitable boring machine, not shown, so that it rotates about the axis 9 of the support when the motor of the machine is in operation. The front end portion of the support 1 is formed with a transverse recess R which is flanked by two legs 3 and 4 disposed at the opposite sides of the axis 9.

The recess R between the legs 3 and 4 accommodates a carrier or clamp 5 having a rear end face which abuts against the bottom surface 6 in the recess R of the support 1. The clamp or carrier 5 extends transversely of the support 1 and at least substantially along the entire length of the recess R between the legs 3 and 4, as considered at right angles to the axis 9. The front end face of the carrier 5 (namely that end face which faces away from the conical rear end portion 2) is formed with an undercut dovetailed guide groove 7 which has two open ends and receives complementary portions 16, 16' of two neighboring knife holders 8, 8' movable in the groove 7 at right angles to the axis 9 of the support 1. As can be readily seen in FIG. 2, the holders 8 and 8' partially overlap each other and the outermost portions of such holders can extend outwardly beyond the outline of the cylindrical intermediate portion of the support 1. The outermost portions of the holders 8 and 8' (as considered at right angles to the axis 9 of the support 1) carry detachable knives in the form of small blades 10 and 10' which are secured thereto by screws 110 (one shown in FIG. 1) or by analogous fasteners. Each of the blades 10 and 10' resembles a small plate and is preferably invertible so that each of its plural cutting edges can be used for removal of material when the improved tool is in use. As can be seen in the lower portion of FIG. 1, the blades 10 and 10' extend radially beyond the outline of the cylindrical portion of the support 1 so that they can penetrate into the material of a workpiece in order to drill or to enlarge a hole or bore to a diameter which is greater than the diameter of the cylindrical portion of the support.

Each of the holders 8 and 8' has an elongated slot 11, 11' which extends in the longitudinal direction thereof, namely, at right angles to the axis 9 of the support 1 and lengthwise of the guide groove 7. FIG. 1 merely shows one of the slots 11, 11' by broken lines, namely, the slot 11 in the left-hand holder 8. Portions of the two slots 11 and 11' are in permanent register with one another as well as with a hole 3a in the leg 3 and with a tapped bore or hole 4a in the leg 4. The hole 3a receives the head 13 and a portion of the shank of an elongated threaded member here shown as a clamping screw 12. The shank of such screw further extends, with clearance, through the registering portions of the slots 11, 11' and into the tapped bore 4a so as to urge the legs 3 and 4 toward each other and to thereby clamp the carrier 5 between the internal surfaces of such legs when the clamping screw is driven home. The diameter of the shank of the clamping screw 12 equals or approximates the width of the slot 11 or 11'. The length of the slot 11 or 11' equals L (see FIG. 5).

The width of the carrier 5, as considered in a direction from the inner side of the leg 3 toward the inner side of the leg 4, slightly exceeds the combined thickness of the holders 8 and 8'. The difference is in the range of a few micrometers. Furthermore, and as shown in FIG. 3, those sides or lateral surfaces of the carrier 5 which are adjacent to the inner sides of the legs 3 and 4 are formed with relatively shallow but rather wide elongated flexure-enhancing flutes 14 and 14' which are closed by the adjacent inner surfaces of the respective legs 3 and 4. Each of the flutes 14 and 14' extends along the full length of the carrier 5. When the clamping screw 12 is driven home, the legs 3 and 4 exert pressure against the portions 15 and 15' of the carrier 5, namely, against the portions which bound the sides of the dovetailed guide groove 7 in the front end face of the carrier (see particularly FIG. 3). The inner sides of the portions 15 and 15' make an oblique angle with the axis 9 of the support 1, and such inner sides bear against the adjacent complementary surfaces on the aforementioned rear or inner portions 16 and 16' of the respective holders 8 and 8', namely on those portions of the holders which extend into the guide groove 7 (refer again to FIG. 3). This ensures that the neighboring surfaces of the holders 8 and 8' are biased against each other. Furthermore, the engagement of portions 15 and 15' on the carrier 5 with portions 16 and 16' on the respective holders 8 and 8' generates a force having a component which is directed toward the rear end portion 2 of the support 1 and acts in parallelism with the axis 9 so as to ensure that the holders 8 and 8' are held without any wobbling when the clamping screw 12 is driven home. The just mentioned component of force which is generated in response to the application of clamping screw 12 causes the rear or inner end faces of the holder portions 16 and 16' to bear against the surface at the bottom of the guide groove 7 in the front end face of the carrier 5. The clamping screw 12 causes some flexing of front portions of the legs 3 and 4 toward each other so that such front end portions of the two legs exert additional retaining force upon the respective (neighboring) holders 8 and 8'.

The carrier 5 is further formed with two tapped bores 17 and 17' which are respectively located behind and are adjacent to portions 16 and 16' of the corresponding holders 8 and 8'. The bores 17 and 17' are parallel to each other and extend at right angles to the axis 9; they respectively receive the shanks of adjusting or shifting screws 18 and 18' having cylindrical heads 19 and 19' (see particularly FIGS. 1 and 5). The holders 8 and 8' are respectively provided with partially cylindrical notches 21, 21' and the carrier 5 is formed with partially cylindrical notches 20 and 20'. The notch 20 complements the notch 21 to form therewith a cylindrical chamber for the head 19 of the shifting screw 18, and the notches 20', 21' cooperate to form a cylindrical chamber for the head 19' of the shifting screw 18'. The notches 20 and 20' have open outer ends so as to permit the respective heads 19 and 19' to emerge from such notches in response to appropriate rotation of the corresponding shifting screws 18 and 18'. On the other hand, the sockets 21 are designed in such a way that the corresponding heads 19 and 19' are not free to move axially therein. Consequently when the screw 18 or 18' is rotated in its tapped bore 17 or 17' which is machined into the rear portion of the carrier 5, the heads 19 and 19' cause the corresponding holders 8, 8' to move transversely of the axis 9 of the support 1, either in a direction to move the two blades 10 and 10' nearer to each other or in the opposite direction. This enables an operator to change the positions of the holders 8 and 8' with reference to each other and to thereby select the diameter of the bore or hole which is to be machined by the cutting edges of the blades 10 and 10' when the machine rotates the support 1. The axial length of the notches 20, 20' and of the heads 19, 19' exceeds the extent of adjustability of the holders 8, 8' relative to the carrier 5. This ensures that the heads 19 and 19' do not extend outwardly from and completely beyond the respective notches 20, 20' even if the holders 8 and 8' are moved to their outermost positions which are illustrated in FIG. 5. Consequently, chips and/or other foreign matter cannot penetrate into the notches 20, 20', and such foreign matter cannot be wedged between the surfaces bounding the notches 20, 20' and the adjacent surfaces of the heads 19, 19'. Foreign matter in such areas could interfere with or prevent accurate adjustment of the holders 8, 8' and the impurities at the outer ends of the heads 19, 19' could score the surface surrounding a bore or hole which is being drilled by the cutting edges of the blades 10 and 10'. It is to be borne in mind that the heads 19 and 19' rotate about the axis 9 when the improved tool is in actual use; therefore, any foreign matter at the outer ends of the heads 19 and 19' could contact the surface surrounding a freshly drilled bore if the outer ends of such heads were allowed to move radially of the axis 9 and well beyond the outer ends of the corresponding notches 20 and 20'. In order to allow for convenient rotation of the shifting screws 18 and 18', the outer end faces of the heads 19, 19' are provided with hexagonal sockets 19a, 19a' (see FIG. 5) or with otherwise configurated (for example, cruciform) sockets which can receive the working ends of suitable torque-transmitting tools, not shown.

Those surfaces of the holders 8 and 8' which abut against each other are formed with relatively shallow elongated recesses 22, 22' which surround the respective ends of the elongated slots 11, 11' and extend beyond such slots, as considered in the radial direction of the support 1 (see particularly FIG. 5). The recesses 22, 22' extend lengthwise of the respective holders 8, 8' and outwardly (toward the respective blades 10 and 10') through distances X (see FIG. 5) each of which equals the length L of the slot 11 or 11' minus the width B of such slot. The value of X can exceed the difference between L and B. The latter further denotes the diameter of the shank of the clamping screw 12. The distance X equals that between a concealed inner edge portion or inner end 23 or 23' of the holder 8 or 8' and the adjacent terminal portion of the corresponding recess 22 or 22'.

The recesses 22, 22' accommodate an elongated plate-like intercepting member 24 which is formed with a centrally disposed hole 24a for the shank of the clamping screw 12. The width of the intercepting member 24 matches the width of the recesses 22, 22' and its thickness equals the combined depth of the recesses 22 and 22'. The length of the intercepting member 24 equals or exceeds L plus X (i.e., 2L minus B) so that this member invariably overlies those portions of the respective ends of the slots 11 and 11' which are not in register with one another, irrespective of the positions of knife holders 8 and 8' with reference to each other, i.e., irrespective of the distance between the blades 10 and 10'. In other words, the intercepting member 24 invariably covers or seals those portions of the slots 11, 11' which are not overlapped by the holders 8, 8' and are not filled by the clamping screw 12. The outer ends of the slots 11, 11' are always overlapped by the legs 3, 4 of the support 1. This ensures that chips, shavings and/or other foreign matter cannot penetrate into the slot 11 and/or 11' irrespective of the selected distance between the blades 10 and 10', i.e., irrespective of the selected diameter of the bore which is being formed by the tool. As shown in FIG. 5, the front end of the slot 11' is partially exposed by the holder 8 in the fully extended positions of the holders 8 and 8' so that, in the absence of the intercepting member 24, that portion of the front end of the slot 11' which extends to the right and beyond the inner edge face 23 of the holder 8 would be free to receive shavings, chips or the like. The intercepting member 24 is held in the recesses 22 and 22' because its hole 24a receives a portion of the shank of the clamping screw 12. This member slides along the edge faces 122, 122' in the respective recesses 22, 22' when the holders 8 and 8' are moved relative to each other; however, the extent of its movement relative to the holders 8, 8' or vice versa is not sufficient to permit exposure of the one and/or the other end of the elongated slot 11 or 11' in any of the relative positions of blades 10, 10' with reference to each other.

The front end faces of the holders 8 and 8' are respectively provided with graduated scales 25, 25' which are shown in FIG. 2 and cooperate with suitable indices or markers 26, 26' on the front end faces of the legs 3 and 4. This facilitates accurate selection of the positions of the two holders 8, 8' with reference to each other, namely, the diameter of the hole or bore which is to be drilled or finished by the cutting edges of the blades 10 and 10'. Another function of the scales 25, 25' and of the associated markers 26, 26' is to ensure that the operator can readily adjust the holder 8 to the same extent as the holder 8', or vice versa. The positions of the scales 25, 25' and of the associated markers 26, 26' can be reversed.

The outer sides of the legs 3 and 4 are formed with tapped bores whose axes are normal to and cross in space with the axis 9 of the support 1 (see particularly FIG. 2). the just mentioned bores respectively receive headless grub screws 27, 27' having conical tips which extend into complementary conical sockets 28, 28' of the carrier 5. The axes of the sockets 28, 28' are more distant from the bottom surface 6 in the front end face of the support 1 than the axes of the screws 27, 27' so that, when the screws 27, 27' are driven home, the carrier 5 is urged toward the surface 6 to thus avoid wobbling or vibrations of the carrier relative to the support 1.

The improved tool further comprises a centering pin 29 which extends into a blind bore 30 in the surface 6 of the support 1 as well as into a bore 31 in the rear end face of the carrier 5 (see particularly FIGS. 3 and 7).

The rear end face of the carrier 5 is formed with a coolant-conveying groove or channel 32 (see FIG. 3 or 7) which communicates with an axially extending coolant-conveying bore or channel 33 in the support 1. The outer ends of the groove 32 (which extends substantially diametrically of the carrier 5 (see FIG. 7) communicate with coolant-conveying channels or passages 24, 24' which are respectively directed toward the adjacent exposed surfaces of the blades 10 and 10' (note FIG. 2). The manner in which the coolant is supplied to the rear end of the channel 33 in the support 1 is not specifically shown in the drawing.

An important advantage of the improved tool is that the carrier 5 and the holders 8, 8' can be fully assembled prior to insertion of the carrier into the recess R in the front end portion of the support 1. Furthermore, the required distance between the cutting edges of the blades 10, 10' can also be selected prior to installation of the carrier 5 between the legs 3, 4 of the support 1. The legs 3, 4 cooperate with the portions 15, 15' of the carrier 5 to ensure that a pronounced torque can be transmitted to the holders 8, 8' without risking any uncontrolled displacement of the holders relative to the carrier and/or any uncontrolled shifting of the carrier with reference to the support 1. This holds true irrespective of whether the blades 10, 10' are close to or remote from each other because, even if the blades 10, 10' are moved apart as far as possible, the carrier 5 still confines substantial parts of the two holders 8, 8' to thus prevent bending and/or other types of deformation which could affect the quality of the work and/or permit shifting and/or escape of the holders from their carrier. The surfaces bounding the guide groove 7 are invariably in substantial contact with the adjacent surfaces of the holders 8, 8' to ensure that, with assistance from the clamping screw 12, the holders are properly held against bending or flexing about axes which extend radially of the axis 9 of the support 1.

Another important advantage of the improved tool is that the carrier 5 bears directly against the bottom surface 6 in the recess R so that coolant, which is supplied via axial channel 33 of the support 1, can be conveyed directly to the locations where the cutting edges of the blades 10, 10' remove material from the workpiece. Thus, all that is necessary is to provide the inner or rear end face of the carrier 5 with the aforementioned channel 32 which communicates with the discharge end of the channel 33 as well as with the intake ends of the channels 34, 34', i.e., with the passageways leading directly to the exposed sides of the blades 10 and 10'.

An additional important advantage of the improved tool is that, at least in many instances, a single clamping screw (12) suffices to ensure that the carrier 5 is properly held in the recess R and that the holders 8, 8' are properly held in the guide groove 7. This is due to the fact that the width of the carrier 5 (as measured at right angles to the axis 9 and in a direction from the inner side of the leg 3 toward the inner side of the leg 4) slightly exceeds the combined width of the holders 8, 8' and that the holes 3a and 4a are close to the free forward ends of the respective legs 3, 4 so that such legs constitute relatively long lever arms which can bear against the fluted lateral surfaces of the carrier 5 and can cause the portions 15, 15' of the carrier to bear against the portions 16, 16' of the respective holders 8, 8' with a force that is amply sufficient to prevent uncontrolled shifting of the carrier relative to the support 1 and/or uncontrolled shifting of the holder 8 and/or 8' relative to the carrier. The provision of flutes 14, 14' contributes to flexibility of the carrier 5 in the regions between its base or rear portion and the portions 15, 15' so that the latter portions can bear against the portions 16, 16' of the respective holders 8, 8' to thus prevent any uncontrolled shifting of the holders lengthwise of the guide groove 7 when the clamping screw is applied with requisite force. The locations where the portions 15, 15' are flexed relative to the base or rear portion of the carrier 5 are remote from the bottom surface 6 in the recess R; this also contributes to ability of the carrier portions 15, 15' to engage and retain the adjacent portions 16, 16' of the holders 8, 8' with a requisite force even if the clamping means comprises a single screw or an analogous elongated threaded member.

Still another important advantage of the improved tool is that the intercepting member 24 invariably prevents penetration of chips, shavings or the like into the slots 11 and 11' irrespective of the selected distance between the blades 10 and 10'. As mentioned above, the recesses 22, 22' for the intercepting member 24 extend all the way to the inner ends or end faces 23, 23' of the respective holders 8, 8', and such recesses further extend beyond the respective slots 11, 11' (in directions toward the corresponding blades 10, 10') through distances X (i.e., L minus B). The overall length of each of the recesses 22, 22' is preferably in the range of 2L minus B, i.e., L plus X. The edge faces 122, 122' of the holders 8, 8' (these edge faces bound the respective recesses 22, 22') serve as a means for guiding the adjacent marginal portions of the intercepting member 24 while the holders are moved relative to each other and with respect to the carrier 5. Such mounting and dimensioning of the intercepting member 24 and of the recesses 22, 22' ensures that those portions of the respective ends of the slots 11, 11' which are not occupied by the shank of the screw 12 are invariably overlapped by the member 24 in each and every position of adjustment of the holders 8, 8' relative to the carrier 5. The other ends of the slots 11, 11' are concealed by the respective legs 3, 4 of the support 1.

The surfaces bounding the inner sides of the rear portions 16, 16' of the holders 8, 8' and the adjacent surfaces of the carrier portions 15, 15' are preferably flat and smooth so that, when the clamping screw 12 is applied, the portions 15, 15' cause the portions 16, 16' to bear against the bottom surface in the guide groove 7 of the carrier 5 and to thus reduce the likelihood of or to positively prevent any wobbling and/or vibratory movements of the holders relative to the carrier. Since the just discussed surfaces are inclined with reference to the axis 9 of the support 1 and make acute angles with the bottom surface 6 in the recess R, the aforediscussed tendency of the portions 16, 16' to bear against the bottom surface in the groove 7 takes place in automatic response to application of clamping forces which urge the portions 15, 15' of the carrier 5 against the portions 16, 16' of the respective holders 8 and 8'. The component of the force which urges the portions 16, 16' of the holders 8, 8' against the bottom surface in the guide groove 7 can be quite pronouned so that the likelihood of uncontrolled shifting of the holders relative to the carrier 5 is practically nil.

The aforediscussed dimensioning of notches 20, 20' and 21, 21' brings about the advantage that shavings, chips or other foreign matter cannot penetrate between the peripheral surfaces of the heads 20, 20' and the adjacent surfaces of the carrier 5 and holders 8, 8', i.e., such foreign matter cannot interfere with accurate adjustment of the two holders relative to the carrier and the foreign matter cannot cause uncontrolled or undesired shifting of the holders relative to each other and relative to the carrier.

The aforediscussed grub screws 27 and 27' cooperate with the surfaces bounding the respective sockets 28, 28' to urge the rear end face of the carrier 5 against the bottom surface 6 in the recess R. This is due to the fact that the axes of the sockets 28, 28' are more distant from the bottom surface 6 than the axes of the tapped bores for the grub screws 27 and 27'. The grub screws 27 and 27' are disposed at the opposite sides of the axis 9 of the support 1 in such positions that they can urge the rear end face of the carrier 5 against the bottom surface 6 even if the width of the carrier does not exactly match the width of the corresponding portion of the recess R, i.e., the grub screws 27, 27' cooperate with the surfaces bounding the sockets 28, 28' to compensate for eventual tolerances in the machining of the carrier 5 and/or legs 3 and 4.

The feature that the portions 15, 15' bear against the portions 16, 16' even if the clamping screw 12 is removed or is not driven home with full force ensures that the holders 8, 8' are not freely slidable in their guide groove 7, i.e., such prestressing of the carrier 5 in response to insertion of the holders 8, 8' into its guide groove 7 facilitates assembly of the holders with the carrier prior to insertion of the carrier into the recess R. In other words, the holders 8, 8' can be inserted into the guide groove 7 while the carrier 5 is detached from the support 1, and the distance between the blades 10, 10' can be selected at such time even though the clamping screw 12 is yet to be inserted through the hole 3a, through the slots 11, 11', through the hole 24a and into mesh with the bore 4a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A material removing tool, comprising a rotary support including a first portion arranged to receive torque from a prime mover, a second portion having an end face, a transversely extending recess in said end face, a bottom surface in said recess, and a pair of legs flanking said recess; a carrier disposed in said recess, abutting said bottom surface and having a front end face facing away from said bottom surface and provided with an elongated guide groove extending transversely of the axis of said support; a pair of abutting knife holders in said guide groove; means for shifting said holders relative to said carrier and lengthwise of said guide groove, said shifting means comprising discrete screws having heads and shanks meshing with said carrier and extending in parallelism with said groove, said carrier and said holders defining chambers for the heads of the respective screws; and clamping means for biasing said legs against said carrier.

2. The tool of claim 1, wherein said bottom surface is elongated, as considered transversely of said axis, and the length of said carrier at least approximates the length of said bottom surface.

3. The tool of claim 1, wherein said guide groove has undercut regions for portions of said holders so that said carrier prevents movements of said holders in the axial direction of said support.

4. The tool of claim 1, wherein said clamping means comprises a threaded member extending through said legs and substantially transversely of said axis.

5. The tool of claim 1, wherein said carrier has flat elongated surfaces flanking said guide groove and making oblique angles with the axis of said support.

6. The tool of claim 1, wherein said holders have elongated slots extending in the longitudinal direction of said guide groove and said clamping means comprises an elongated member extending with clearance through said slots.

7. The tool of claim 1, wherein the width of said carrier slightly exceeds the combined width of said holders, as considered at right angles to the longitudinal direction of said guide groove and transversely of said axis.

8. The tool of claim 5, wherein said flat elongated surfaces make acute angles with said bottom surface.

9. The tool of claim 1, wherein said heads are cylinders and each of said chambers includes a first notch provided in said carrier and a second notch provided in the respective holder, said heads being movable axially in the respective first notches and being received without axial clearance in the respective second notches so that rotation of said heads entails a shifting of the respective holders lengthwise of said guide groove.

10. The tool of claim 9, wherein the axial length of said heads at least matches the extent of shiftability of the respective holders with reference to said carrier.

11. The tool of claim 9, wherein said first notches are open to afford access to the respective heads.

12. The tool of claim 1, wherein said carrier has lateral surfaces adjacent to said legs and further comprising screws meshing with said legs and having tips extending into sockets provided therefor in the respective lateral surfaces.

13. The tool of claim 12, wherein said screws and said sockets cooperate to urge said carrier against said bottom surface.

14. The tool of claim 13, wherein said sockets are of conical shape and the axes of said screws are nearer to said bottom surface than the axes of said sockets.

15. The tool of claim 12, wherein said legs have tapped bores for said screws and such tapped bores are disposed at the opposite sides of said axis.

16. The tool of claim 1, wherein said carrier has portions flanking said holders and bearing against the respective holders so that the holders are biased against each other.

17. The tool of claim 1, further comprising means for facilitating the adjustment of said holders relative to said carrier, as considered in the longitudinal direction of said guide groove, each such facilitating means including a scale element and a marker element, one of said elements being provided on the respective leg and the other of said elements being provided on the respective holder adjacent to the corresponding one element.

18. A material removing tool, comprising a rotary support including a first portion arranged to receive torque from a prime mover, a second portion having an end face, a transversely extending recess in said end face, a bottom surface in said recess, and a pair of legs flanking said recess; a carrier disposed in said recess, abutting said bottom surface and having a front end face facing away from said bottom surface and provided with an elongated substantially dovetailed guide groove extending transversely of the axis of said support and having two undercut regions extending lengthwise thereof; a pair of abutting knife holders in said groove, said holders having portions each extending into a different undercut region to prevent movement of said holders with reference to said carrier in the axial direction of said support; and clamping means for biasing said legs against said carrier, said carrier having lateral surfaces extending lengthwise of said guide groove and each adjacent to a different one of said legs, said lateral surfaces having longitudinally extending flutes which promote the deformability of said carrier into frictional engagement with said holders under the action of said clamping means.

19. The tool of claim 18, further comprising means for shifting said holders lengthwise of said guide groove and relative to each other.

20. A material removing tool, comprising a rotary support including a first portion arranged to receive torque from a prime mover, a second portion having an end face, a transversely extending recess in said end face, a bottom surface in said recess, and a pair of legs flanking said recess; a carrier disposed in said recess, abutting said bottom surface and having a front end face facing away from said bottom surface and provided with an elongated guide groove extending transversely of the axis of said support; a pair of abutting knife holders in said guide groove, each of said holders having an outer end and an inner end, as considered transversely of said axis; shifting means for adjusting said holders with reference to said carrier; knives provided at the outer ends of said holders, said holders further having abutting surfaces and elongated slots terminating in the respective abutting surfaces and extending lengthwise of said guide groove and recesses provided in said abutting surfaces, surrounding the respective ends of the corresponding slots and extending beyond such slots toward the respective knives; clamping means for biasing said legs against said carrier, said clamping means comprising an elongated member extending with clearance through said slots; and an intercepting member installed in the recesses of said holders and having a hole for said elongated member, said intercepting member overlying said slots in each position of adjustment of said holders relative to said carrier to thus prevent the penetration of foreign matter into said slots.

21. The tool of claim 20, wherein said guide groove is a substantially dovetailed groove having two undercut regions extending lengthwise thereof and said holders have portions each extending into a different undercut region to prevent movement of said holders with reference to said carrier in the axial direction of said support.

22. The tool of claim 20, wherein said intercepting member includes an elongated plate extending laterally beyond the opposite sides of said elongated member through distances which at least equal the length of a slot minus the diameter of said elongated member.

23. The tool of claim 22, wherein the recesses of said holders extend all the way to the inner ends of the respective holders.

24. The tool of claim 20, wherein the recesses of said holders extend beyond the respective slots and toward the respective knives through distances equaling the length of a slot minus the diameter of said elongated member.

25. The tool of claim 20, wherein said holders have edge faces flanking the recesses therein and arranged to guide said intercepting member during adjustment of said holders with reference to said carrier.

* * * * *